Dec. 15, 1925.

A. BOUSFIELD

SCALE LOOP

Filed Feb. 14, 1925    2 Sheets-Sheet 1

1,565,251

INVENTOR

Alfred Bousfield,

BY

M. N. Garnett

ATTORNEY

Dec. 15, 1925. 1,565,251
A. BOUSFIELD
SCALE LOOP
Filed Feb. 14, 1925    2 Sheets-Sheet 2

INVENTOR
Alfred Bousfield,
BY
M. N. Gannett
ATTORNEY

Patented Dec. 15, 1925.

1,565,251

UNITED STATES PATENT OFFICE.

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

SCALE LOOP.

Application filed February 14, 1925. Serial No. 9,115.

*To all whom it may concern:*

Be it known that I, ALFRED BOUSFIELD, a citizen of the United States of America, residing at St. Johnsbury, in the county of Caledonia and State of Vermont, have invented certain new and useful Improvements in Scale Loops, of which the following is a full, clear, and exact description, such as will enable other skilled in the art to which it appertains to make and use the same.

This invention relates to improvements in weighing scales, and more especially to means for connecting the load transmitting rod of a platform scale to the weigh-beam.

It is a general object of the invention to provide a connection of the class mentioned in which simplicity of construction, ease of repair or replacement of the parts, and economies in production costs are attained.

Another object of the invention is to provide a scale loop of the class mentioned which can be readily formed from stamped metal parts.

A still further object of the invention is to provide a scale loop with means whereby a rocking adjustment between the loop and the pivot from which it is suspended may be readily accomplished with a full line contact along the knife edges of the pivot by the bearing plates of the loop.

Another object of the invention is to provide means for limiting the lateral movement of a scale loop with respect to the pivot on which it is mounted.

Other objects will be in part obvious in connection with the following detailed description of an illustrative embodiment of the invention, and will be in part pointed out in connection therewith.

The invention accordingly comprises the features of construction, combination of elements, and arrangement of parts which will be exemplified in the construction hereinafter set forth, and the scope of the application of which will be indicated in the claims.

For a complete understanding of the nature and objects of the invention, reference is had to the following detailed description and to the accompanying drawings wherein—

Figure 1:
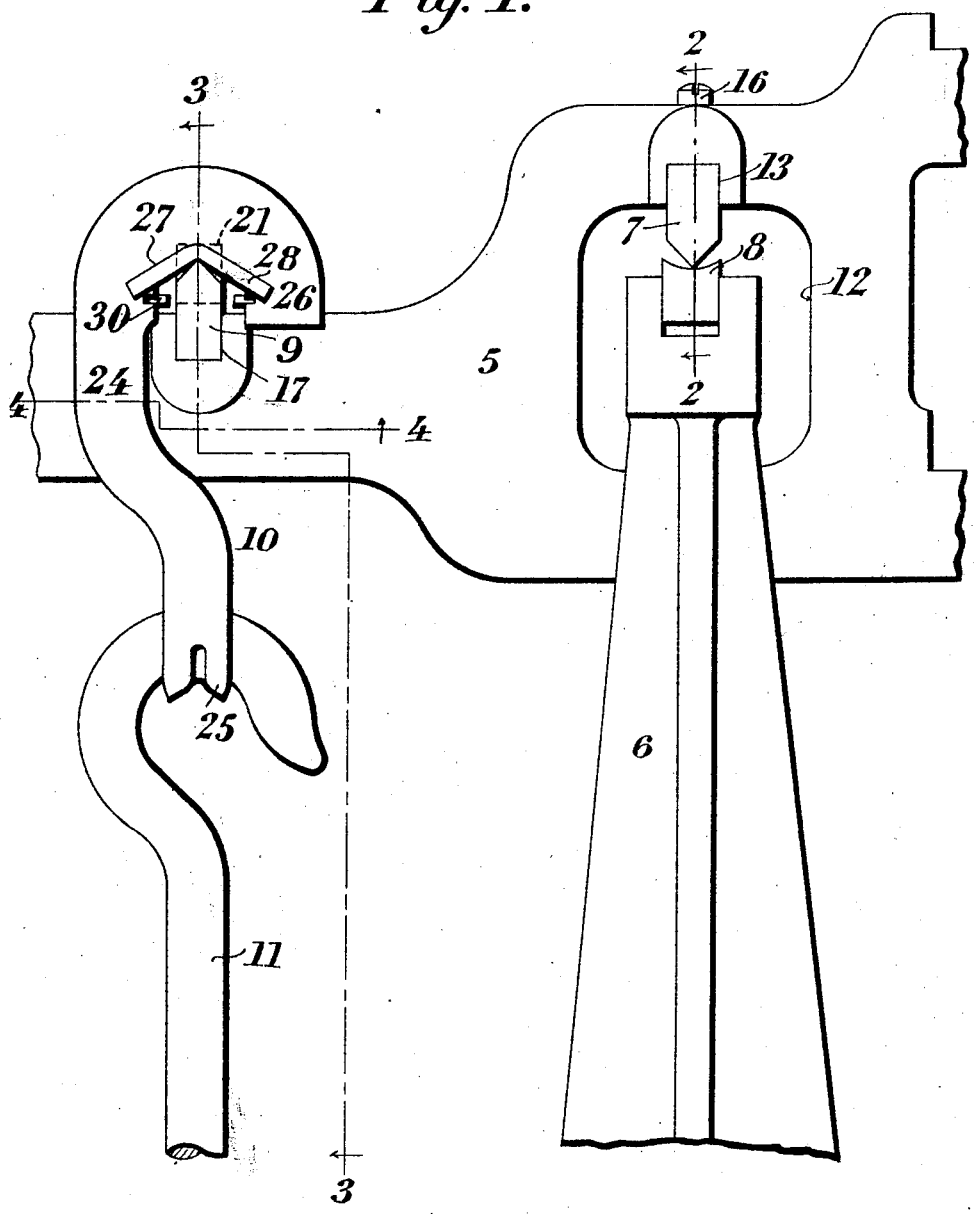
Figure 1 is an elevation of a portion of a weigh-beam showing the application of my invention thereto.

As shown, the weigh-beam 5 is supported upon a stand 6, a knife edge pivot 7 with which the beam is provided being mounted in concaved bearing seats 8 pivoted in the top of the stand. Rearwardly of the pivot 7, the beam is provided with another knife edge pivot 9, from which is suspended a loop 10, that is connected to the lever system of the scale (not shown) through a rod 11, the upper end of the rod being hooked into the loop in the usual manner. The pivot 7 is mounted in the beam with its sharp edge down, while the pivot 9 is arranged with its sharp edge up, the apexes of both pivots lying in substantially the same horizontal plane. Furthermore, the beam is so shaped that the pivot 9 can be positioned along the upper edge thereof, while the pivot 7 is located in an opening 12 formed in the body of the beam.

Figure 2:
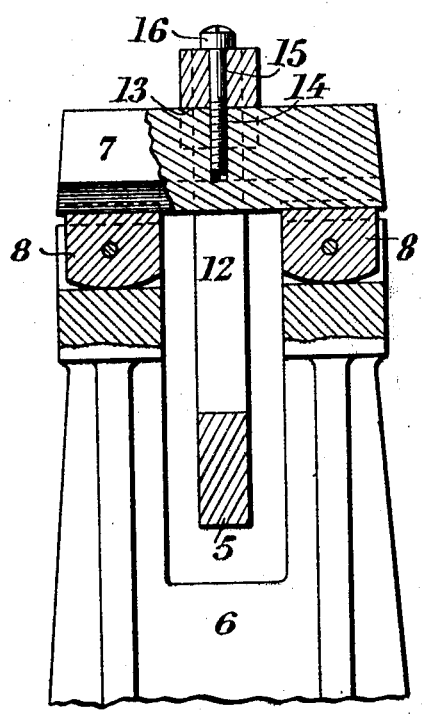
Fig. 2 is a vertical transverse section taken on the line 2—2 of Fig. 1.

Both pivots are detachably mounted in the beam. As particularly shown by Fig. 2, the upper part of the beam above the opening 12 is thickened, and a rectangularly shaped notch 13 is formed in such thickened part. The bearing 7 is tightly fitted in the notch 13, and is disposed transversely of the beam so that its free ends can project outwardly from the beam for the purpose of providing a long bearing surface. A threaded opening 14 is formed in the bearing 7 in alinement with an opening 15 extending downwardly through the beam, and a cap screw 16 having its shank passed through the opening 15, and its end threaded into the bearing 7, serves as means for retaining the bearing in fixed position within the notch 13.

Figure 3:
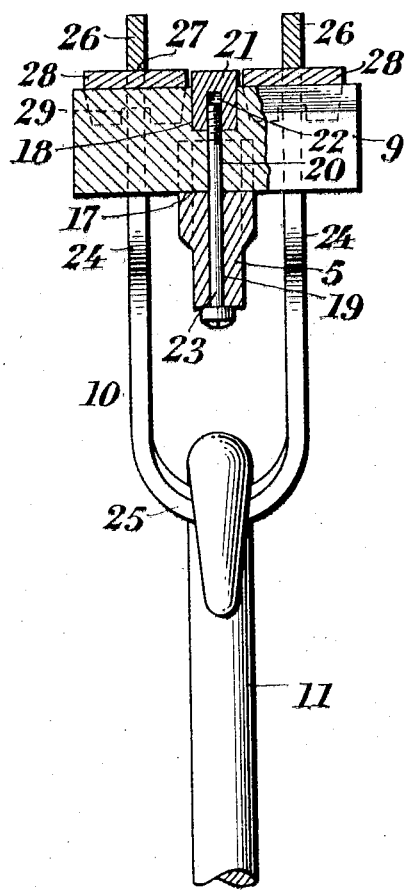
Fig. 3 is a similar view taken on the line 3—3 of Fig. 1.
Figure 4:
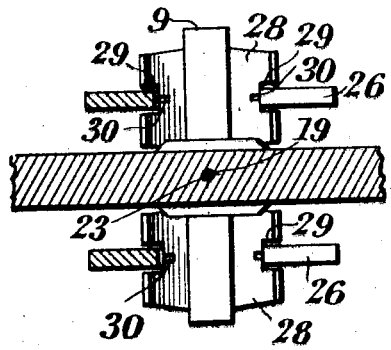
Fig. 4 is a horizontal section taken on the line 4—4 of Fig. 1.

As particularly shown by Fig. 3, a rectangular notch 17 is formed in a thickened portion of the upper edge of the beam for the reception of the pivot 9, the knife edge of such pivot being up and having a slot 18 cut therein. A vertical opening 19 is drilled through the beam. The pivot 9 has a similar opening 20 therein, which opening communicates with the notch 17, and aligns with the opening 19, when the parts are assembled. A rectangular block 21, having a threaded recess 22 in its bottom, is tightly fitted in the slot 18, the upper part of the block projecting above the knife edge of the pivot, as clearly shown. The pivot 9 is held in position by means of a bolt 23 that is passed upwardly through the openings 19 and 20 and screwed into the block 21. Thus it will be seen that the block functions as a nut for the bolt 23, and also as an anti-friction stop for limiting the lateral movement of the loop 10 with respect to the beam, as will be hereinafter more fully described.

The loop 10 is preferably made in the form of a U (see Fig. 3) so as to provide a pair of spaced limbs 24, that are adapted to be disposed on each side of the beam 5 and be suspended from the pivot 9. The loop is constructed slightly different from those heretofore used for a similar purpose. Its limbs extend upwardly from the curved bottom 25, and then they are offset rearwardly, then upwardly, and then bent forwardly and downwardly, so as to provide hook-like members 26 of inverted U form.

The center of the undersides of the members 26 are formed inclined, like an inverted V, so as to provide a seat 27 for receiving a correspondingly shaped bearing plate 28. The plates are preferably made somewhat wider than the seats 27, and notches 29 are cut into the lateral sides of the plates, so that the edges of the loop adjacent to the seats 27 may pass therethrough. In this manner, the plates will be prevented from sliding from their seats.

For the purpose of retaining the plates in position, lugs 30 are struck up from the sides of the loop adjacent each end of the plates. The notches 29 are made wide enough so that the edges thereof will loosely engage with the sides of the portions 26, and the lugs 30 are spaced slightly from the plates. In this manner a freedom of rocking movement between the plates and the loop is provided for, and the plates will automatically adjust themselves to the proper position for contacting with the knife edges of the pivot 9.

As an open passageway is formed by the hook-like members 26 of the loop, when the parts of the scale are being assembled, the loop can be readily hooked over the pivot 9, as will be readily understood, with the plates 28 lying on each side of the block 21. Furthermore, as shown, the inner edges of the plates will be slightly spaced from the adjacent sides of the block 21. This disposition of the parts is such as to permit shifting of the loop with respect to the beam when the parts are displaced, but the arrangement of the parts is such that the plates 28 will be prevented by the block 21 from sliding off of the pivot.

An inexpensive and convenient method of producing the loop above described has been devised and being substantially as follows: Blanks having the general outline illustrated are stamped from sheet metal. The V-shaped pivot plates 28 are cut from bars of steel having substantially the cross-sectional shape of the plates illustrated. These plates are then punched at the lateral edges thereof to provide the notches 29, and the angular V-shaped bearing surface may be smoothed or otherwise conditioned, as by grinding. The plate, as thus formed, is placed in its supporting seat in the loop and the lugs 30 then struck up from the adjacent metal by means of a suitable punch.

Since certain changes may be made in the above construction, and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described my invention, what I claim and desire to secure by Letters Patent is:—

1. In a scale, the combination with a weigh-beam having a pivot, of a loop suspended from said pivot, said loop having spaced arms, the extremities of which are of inverted U-form for engaging the said pivot, and means carried by the pivot for limiting the lateral movement of the said loop.

2. In a scale, the combination with a weigh-beam having a pivot, of a loop suspended from said pivot, said loop having spaced arms, the extremities of which are of inverted U-form, bearing plates mounted in the extremities of the arms for engagement with the said beam pivot, and means carried by the pivot for limiting the lateral movement of said plates.

In testimony whereof I hereunto sign my name.

ALFRED BOUSFIELD.